United States Patent
Mizuno

[11] Patent Number: 5,889,769
[45] Date of Patent: Mar. 30, 1999

[54] SWITCHING SYSTEM LINKED TO RADIO BASE STATION

[75] Inventor: Mitsuyuki Mizuno, Kawasaki, Japan

[73] Assignee: Fujitsu Limited, Kanagawa, Japan

[21] Appl. No.: 905,646

[22] Filed: Aug. 4, 1997

[30] Foreign Application Priority Data

Dec. 3, 1996 [JP] Japan .................................. 8-322844

[51] Int. Cl.$^6$ ..................................................... H04Q 7/22
[52] U.S. Cl. .......................... 370/328; 455/560; 370/389; 370/395
[58] Field of Search ..................................... 455/436, 437, 455/439, 442, 428, 426, 424, 425, 560; 370/331, 332, 328, 389, 391, 342, 335, 333, 351, 355, 401, 395

[56] References Cited

U.S. PATENT DOCUMENTS

| | | | |
|---|---|---|---|
| 5,418,838 | 5/1995 | Havermans | 370/331 |
| 5,425,031 | 6/1995 | Otsuka | 370/336 |
| 5,438,565 | 8/1995 | Hemmady et al. | 370/335 |
| 5,619,551 | 4/1997 | Yahagi | 455/445 |
| 5,646,978 | 7/1997 | Klem et al. | 455/436 |

FOREIGN PATENT DOCUMENTS 1-246937  10/1989  Japan .

Primary Examiner—Chau Nguyen
Assistant Examiner—Kenneth Vanderpuye
Attorney, Agent, or Firm—Helfgott & Karas, PC.

[57] ABSTRACT

A switching system includes N handover runks respectively having M terminals to be independently coupled to radio transmission lines reaching M radio base stations which respectively form radio zones which become mutually adjacent zones or peripheral zones, and coupled to remote transmission lines reaching mobile stations of other parties located in the radio zones, where M and N are integers greater than one, out of the radio transmission lines, the N handover trunks selecting each transmission line with a best transmission quality and coupling the selected radio transmission lines to the remote transmission lines; a plurality of radio interfaces distributing lines independently formed between the switching system and the M radio base stations, with respect to different N paths; a radio transmission line forming unit forming radio transmission lines in advance with respect to all combinations of each of the paths subject to the distribution by the radio interfaces and each of the terminals other than the terminals to be independently coupled to the remote transmission lines out of the terminals of the handover trunks; a call processing unit carrying out a call processing with respect to calls generated by the mobile stations located in the radio zones by cooperating with a radio channel setting control that is carried out by the radio base stations via the radio interfaces; and a remote transmission line forming unit forming the remote transmission lines by the call processing carried out by the call processing unit.

14 Claims, 11 Drawing Sheets

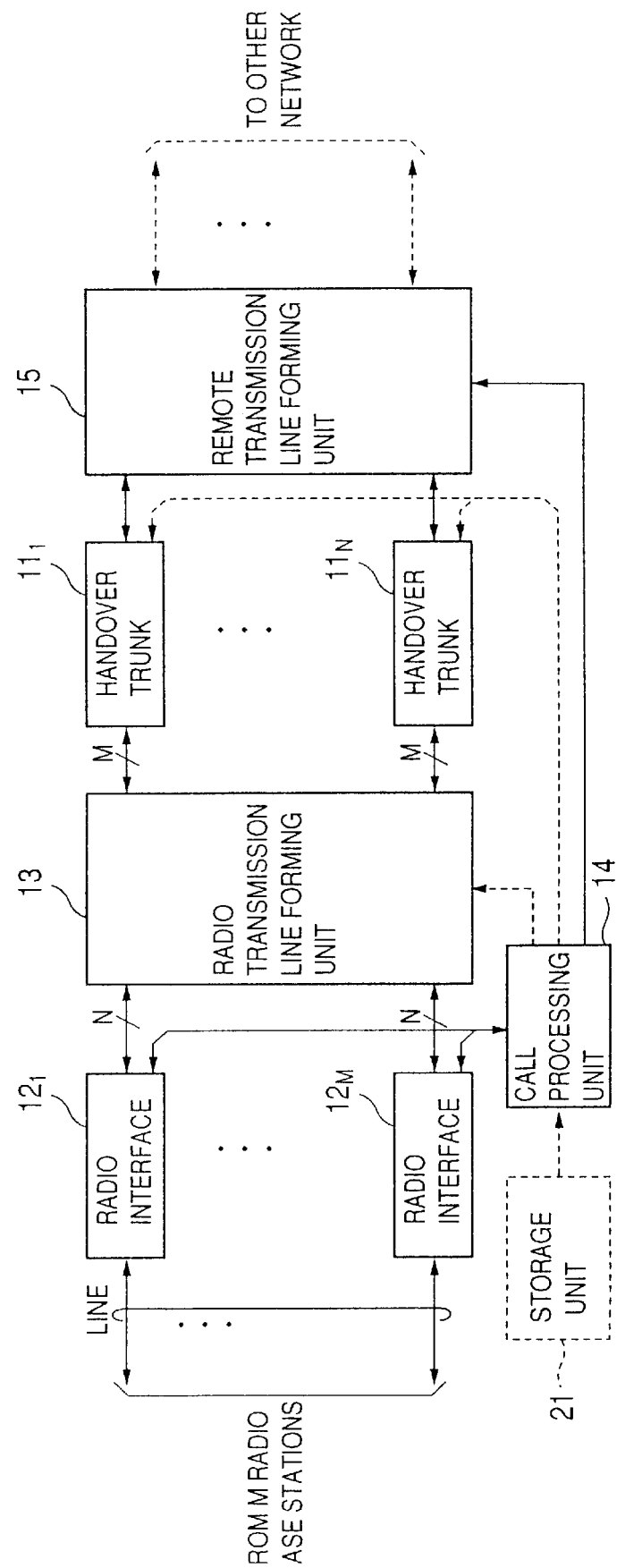

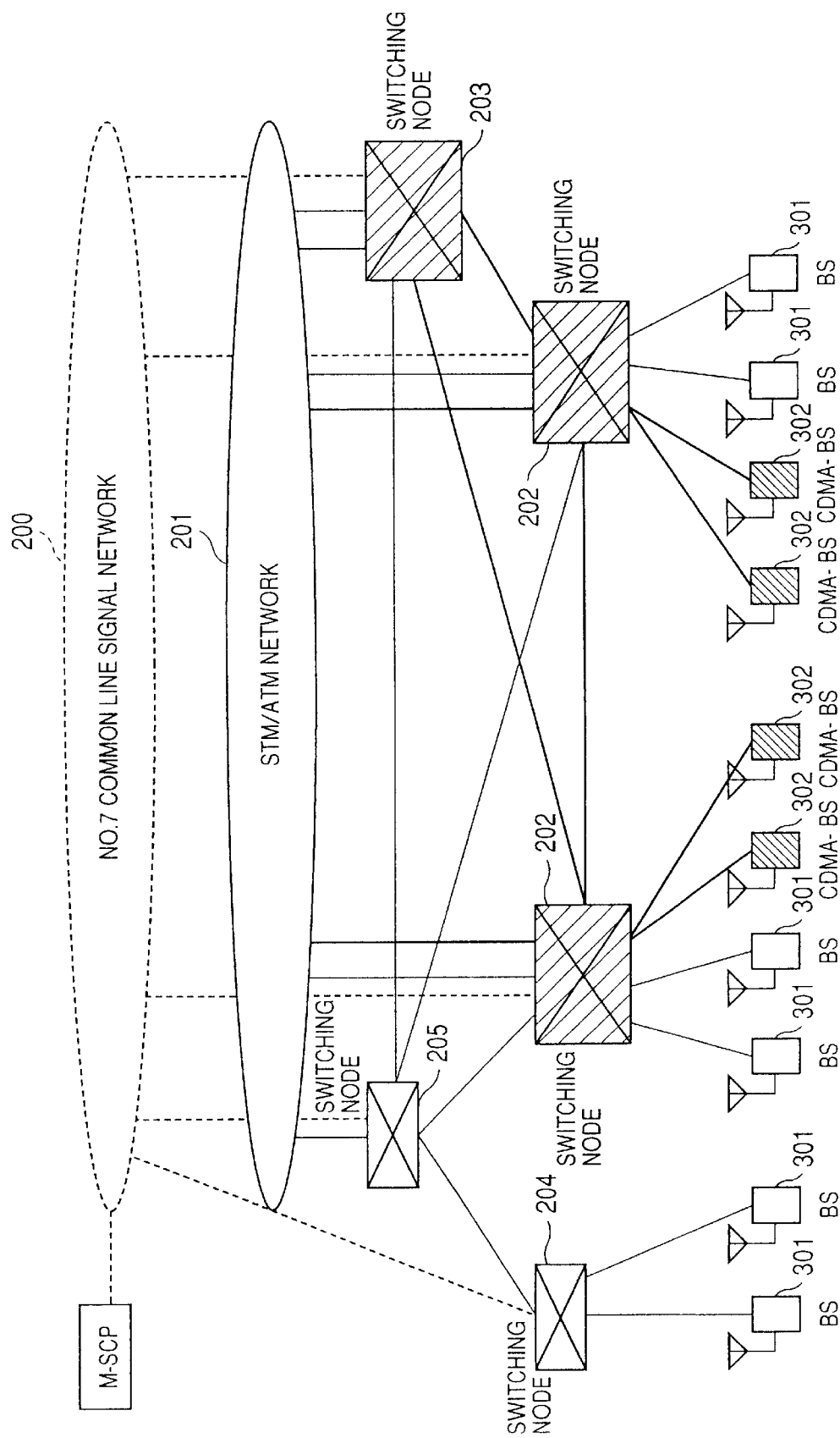

SWITCHING SYSTEM LINKED TO RADIO BASE STATION

BACKGROUND OF THE INVENTION

The present invention generally relates to switching systems, and more particularly to a switching system which is connected via a link to a radio base station of a mobile communication system that carries out switching of channels in service, and processes calls generated in the mobile communication system.

The Code Division Multiple Access (CDMA) was frequently used in communication for military purposes because the CDMA has a superior secrecy and is strong against interference. However, by positively utilizing the strong anti-interference characteristic of the CDMA, it is possible in general to improve the utilization efficiency of radio frequencies. In addition, since techniques for realizing a transmission power control with a high accuracy and an improved response have been established recently, the CDMA is now being applied to mobile communication systems in which mobile stations scattered in radio zones move while maintaining a service state and the switching of the channels in service, that is, handover of the channels, is carried out.

In the mobile communication system applied with the CDMA, the levels of the received waves reaching the base stations of the adjacent radio zones from the mobile station which is the subject of the handover are appropriately varied under the transmission power control described above. For this reason, unlike the mobile communication systems applied with the Time Division Multiple Access (TDMA) or the Frequency Division Multiple Access (FDMA), the radio zone to which the handover is to be made cannot be determined to a single radio zone depending on the levels of the received waves.

Accordingly, in the mobile communication system applied with the CDMA uses an Asynchronous Transfer Mode (ATM) switching system which can smoothly and dynamically switch the radio zone to the radio zone handed over with the call. The ATM switching system and each radio base station are connected via a link adapted to the ATM.

However, in the mobile communication system applied with the CDMA, it was difficult to use a conventional ATM switching system without greatly modifying the construction of the conventional ATM switching system.

In addition, a delay in updating identification information related to the handover causes considerable deterioration of the speech quality, and it was particularly difficult to apply the conventional ATM switching system to a call of a telephone system in the mobile communication system.

SUMMARY OF THE INVENTION

Accordingly, it is a general object of the present invention to provide a novel and useful switching system in which the problems described above are eliminated.

Another and more specific object of the present invention is to provide a switching system which can flexibly cope with frequent generation of handovers, without requiring a considerable modification of hardware.

Still another object of the present invention is to provide a switching system comprising N handover trunks respectively having M terminals to be independently coupled to radio transmission lines reaching M radio base stations which respectively form radio zones which become mutually adjacent zones or peripheral zones, and coupled to remote transmission lines reaching mobile stations of other parties located in the radio zones, where M and N are integers greater than one, out of the radio transmission lines, the N handover trunks selecting each transmission line with a best transmission quality and coupling the selected radio transmission lines to the remote transmission lines; a plurality of radio interfaces distributing lines independently formed between the switching system and the M radio base stations, with respect to different N paths; a radio transmission line forming unit forming radio transmission lines in advance with respect to all combinations of each of the paths subject to the distribution by the radio interfaces and each of the terminals other than the terminals to be independently coupled to the remote transmission lines out of the terminals of the handover trunks; a call processing unit carrying out a call processing with respect to calls generated by the mobile stations located in the radio zones by cooperating with a radio channel setting control that is carried out by the radio base stations via the radio interfaces; and a remote transmission line forming unit forming the remote transmission lines by the call processing carried out by the call processing unit. According to the switching system of the present invention, the selection of the radio transmission line having the best transmission quality is automatically selected by the handover trunks from the radio transmission lines which are formed in advance by the radio transmission line forming unit. For this reason, compared to a case where the radio transmission line is dynamically set by the call processing, the load of the process of switching the transmission lines when making the handover is positively distributed among the handover trunks.

Other objects and further features of the present invention will be apparent from the following detailed description when read in conjunction with the accompanying drawings.

BRIEF DESCRIPTION OF THE DRAWINGS

FIG. 3 is a system block diagram for explaining the operating principle of the present invention;

FIG. 12 is a system block diagram showing a communication system applied with the present invention.

DESCRIPTION OF THE PREFERRED EMBODIMENTS

Figure 1:
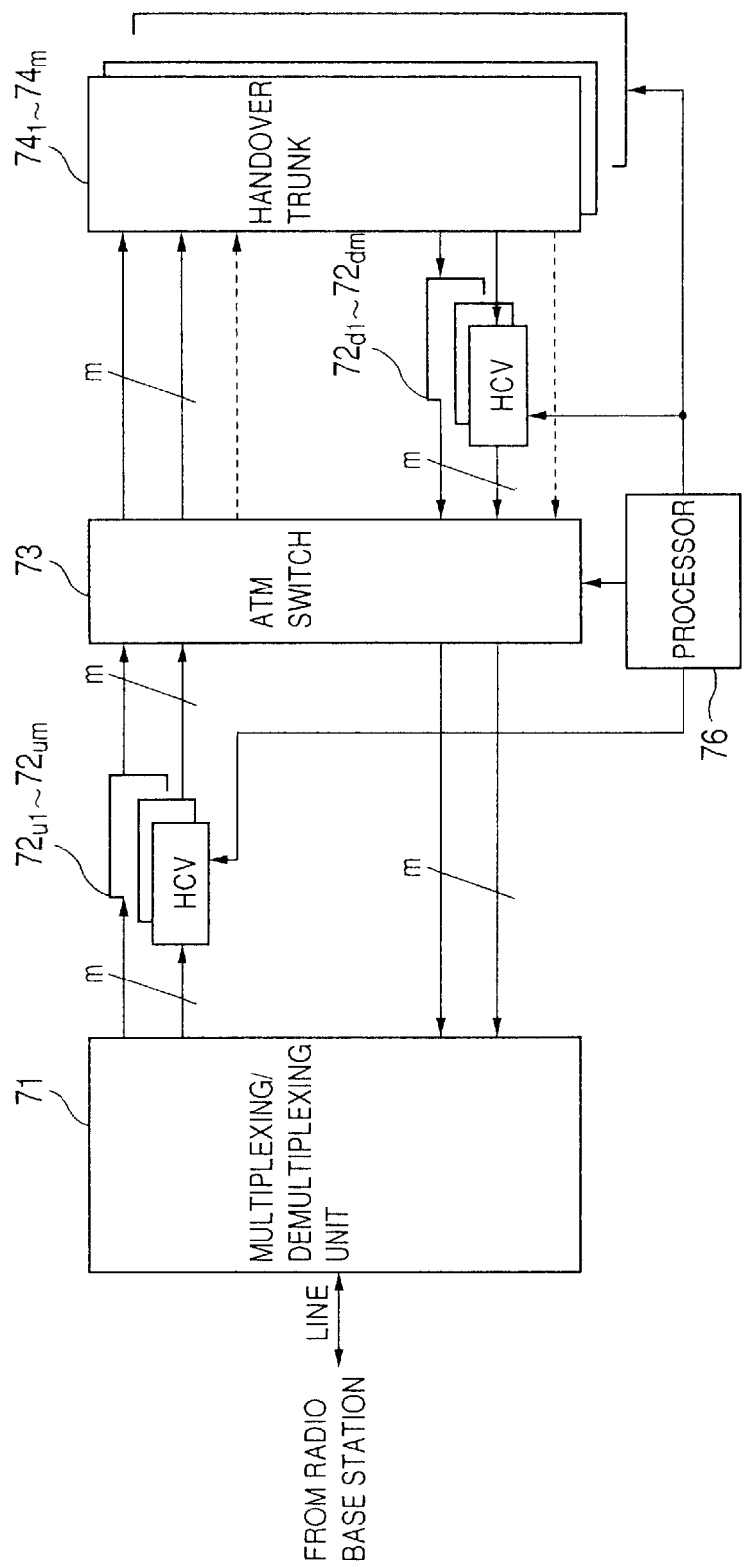
FIG. 1 is a system block diagram showing the construction of a conceivable ATM switching system applied to a mobile communication system.

First, a description will be given of a conceivable ATM switching system in order to facilitate the understanding of the present invention. FIG. 1 is a system block diagram showing the construction of a conceivable ATM switching system applied to a mobile communication system.

In FIG. 1, a radio base station (not shown) is connected to a multiplexing/demultiplexing unit 71 via a full-duplex line. Demultiplexed outputs of the multiplexing/demultiplexing unit 71 are respectively connected to up-terminals of corresponding ports of an ATM switch 73 via header converters (HCV) $72_{u1}$ through $72_{um}$, and down-terminals of these ports of the ATM switch 73 are connected to corresponding multiplexing inputs of the multiplexing/demultiplexing unit 71. Down-terminals of other m ports (hereinafter referred to as handoff ports,) of the ATM switch 73 are connected to corresponding inputs of handover trunks $74_1$ through $74_m$. Outputs of the handover trunks $74_1$ through $74_m$ forming pairs with the inputs of the handover trunks $74_1$ through $74_m$ are connected to up-terminals of the handoff ports of the ATM switch 73 via header converters (HCV) $72_{d1}$ through $72_{dm}$. Control terminals of the header converters $72_{u1}$ through $72_{um}$, the header converters $72_{d1}$ through $72_{dm}$, the ATM switch 73, and the handover trunks $74_1$ through $74_m$ are connected to corresponding output (communication) ports of a processor 76.

Figure 2A:
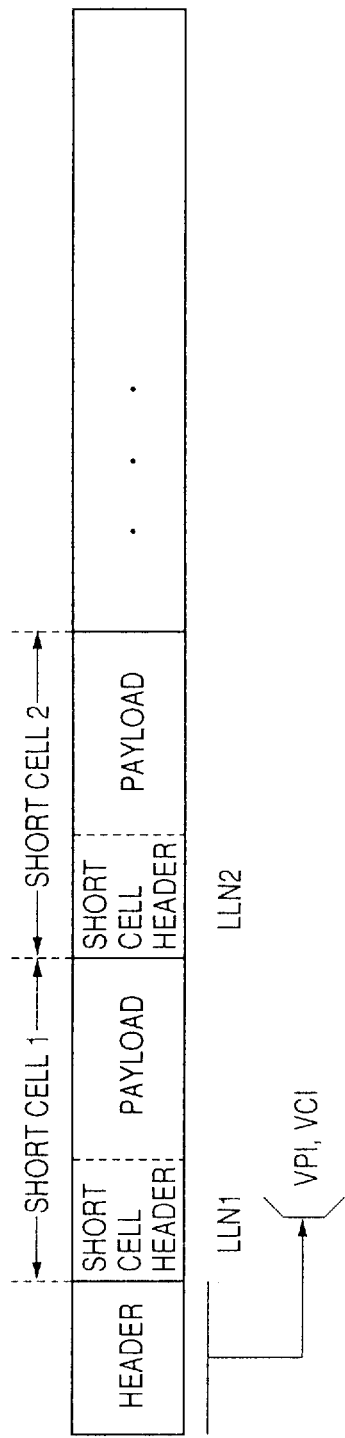
FIG. 2A is a diagram showing the format of a standard cell.

In the mobile communication system applied with the ATM switching system having the construction shown in FIG. 1, the radio base station generates a standard cell shown in FIG. 2A with respect to each radio channel which is allocated by the radio base station based on a predetermined radio channel setting control procedure, and transmits the standard cell to a logical channel. As shown in FIG. 2A, the standard cell includes a header, and one or a plurality of short cells. The short cell includes a short cell header and a payload. In the short cell, the short cell header indicates a base station identification information LLN, and reliability information which indidates a transmission quality of the radio transmission line evaluated by the radio base station. A word indicating a received call signal is arranged in the payload. The header of the standard cell indicates identification information of the logical channel that is formed in advance as a transmission line for the short cell, in an up-link of the full-duplex line described above. This identification information of the logical channel includes a Virtual Path Identifier (VPI) and a Virtual Channel Identifier (VCI).

The multiplexing/demultiplexing unit 71 forms in advance physical channels corresponding to each of the base station identification information $LLN_1$ through $LLN_m$ which may be transmitted from the radio base station, between the multiplexing/-demultiplexing unit 71 and the header converters $72_{u1}$ through $72_{um}$.

Figure 2B:
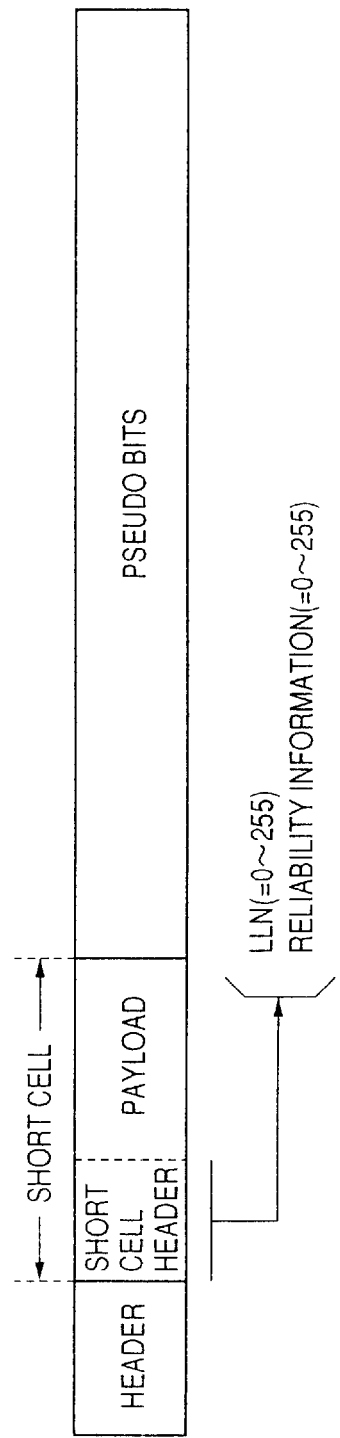
FIG. 2B is a diagram showing the format of a partial filling cell.

In addition, when the standard cell described above is received from the radio base station, the multiplexing/demultiplexing unit 71 divides the standard cell into units of short cells based on the format shown in FIG. 2A, and adds pseudo bits of a predetermined length to the short cell so as to generate a sequence of partial filling cells each having the same word length as the word length of the standard cell as shown in FIG. 2B. The multiplexing/demultiplexing unit 71 also transmits the partial filling cells to the physical channels described above.

The header converters $72_{u1}$ through $72_{um}$ read the partial filling cells which are obtained via the physical channels, and with respect to the partial filling cells, carries out a process of converting the header to the identification information of the logical channels given by the processor 76 according to the call processing procedure before transmitting the partial filling cells to the corresponding ports of the ATM switch 73. In this case, the identification information is ($VPI_{p1}$, $VCI_{p1}$) through ($VPI_{pm}$, $VCI_{pm}$) and indicates the ports of the ATM switch 73 to which the header converters $72_{u1}$ through $72_{um}$ are connected.

The above described ports of the ATM switch 73 are connected to the inputs of the handover trunks $74_1$ through $74_m$ via paths which are formed in the ATM switch 73 based on a line switching system. Furthermore, the inputs of the handover trunks $74_1$ through $74_m$ are connected via other paths which are similarly formed in the ATM switch 73 by the call processing to an adjacent radio base station other than the radio base station described above, more particularly, to a trunk (not shown) which forms an interface adapted to a terminal of the other party or adapted to a transmission line between the stations.

A description related to communication channels formed in up-section from the above trunk to the handover trunks $74_1$ through $74_m$, and in down-sections from the handover trunks $74_1$ through $74_m$ to the radio base station described above via the header converters $72_{d1}$ through $72_{dm}$, the ATM switch 73 and the multiplexing/-demultiplexing unit 71, will be omitted due to the reversibility of the full-duplex line.

The header converters $72_{u1}$ through $72_{um}$ cooperate with the radio channel setting control that is carried out by the radio base station described above to realize the handover and the call processing described above, and successively adapt to an updated result when the identification information of the logical channel given in advance by the processor 76 is updated. Accordingly, the handover trunks $74_1$ through $74_m$ form the parallel transmission lines for the call signals between the handover trunks $74_1$ through $74_m$ and a plurality of radio base stations which can constantly secure a predetermined speech quality depending on the handover, via the header converters $72_{u1}$ through $72_{um}$, the header converters $72_{d1}$ through $72_{dm}$, the ATM switch 73 and the multiplexing/demultiplexing unit 71.

In addition, out of the partial filling cells obtained via the plurality of transmission lines, the handover trunks $74_1$ through $74_m$ compare reliability information included in the short cell headers and constantly select the path corresponding to the radio transmission line (radio base station) having the best transmission quality.

Accordingly, the speech quality of the channels formed via the handover trunks $74_1$ through $74_m$ is maintained to a satisfactory quality while adapting to the change in the transmission characteristic of the radio transmission line and the movement of the mobile station, even when the transmission power of the mobile station changes under the transmission power control.

Illustration and description related to a trunk which is used for the connection to a public network are omitted in the above described conceivable system, because such a trunk is not directly related to the subject matter of the present invention which will be described later.

In the above described conceivable system, however, the processor 76 which gives the identification information of the logical channels to the header converters $72_{u1}$ through $72_{um}$ and the header converters $72_{d1}$ through $72_{dm}$ must update the identification information every time the handover is made, with respect to all of the completed calls. The number of times the identification information is updated is considerably large compared to that for a case where all of the mobile stations do not move. In the ATM transmission line having the transmission rate of 150 Mbps, if the average holding time is three minutes, 20 to 30 times per second is the upper limit of the number of times the identification information can be updated according to the existing technique.

Therefore, in the mobile communication system applied with the CDMA, it is difficult to realize the conceivable ATM switching system without greatly modifying the construction of a conventional ATM switching system.

In addition, a delay in updating the identification information related to the handover causes considerable deterioration of the speech quality, and it is particularly difficult to apply the conceivable ATM switching system to the call of the telephone system in the mobile communication system.

Next, a description will be given of the operating principle of the present invention, by referring to FIG. 3.

In a switching system according to the present invention shown in FIG. 3, N handover trunks $11_1$ through $11_N$ respectively have M terminals to be independently connected to radio transmission lines reaching M radio base stations which respectively form radio zones which become mutually adjacent zones or peripheral zones, and to remote transmission lines reaching mobile stations of other parties located in the radio zones, where M and N are integers greater than one. Out of these radio transmission lines, the N handover trunks $11_1$ through $11_N$ select each transmission line with the best transmission quality and connect the selected radio transmission lines to the remote transmission lines. M radio interfaces $12_1$ through $12_M$ distribute the lines independently formed between the switching system and the M radio base stations, with respect to different N paths. A radio transmission line forming unit 13 forms radio transmission lines in advance with respect to all combinations of each of the paths subject to the distribution by the radio interfaces $12_1$ through $12_M$ and each of the terminals other than the terminals to be independently connected to the remote transmission lines out of the terminals of the handover trunks 111 through $11_N$. A call processing unit 14 carries out a call processing with respect to calls generated by the mobile stations located in the radio zones by cooperating with a radio channel setting control that is carried out by the radio base stations via the radio interfaces $12_1$ through $12_M$. A remote transmission line forming unit 15 forms the remote transmission lines by the call processing carried out by the call processing unit 14.

According to this switching system, the selection of the radio transmission line having the best transmission quality is automatically selected by the handover trunks $11_1$ through $11_N$ from the radio transmission lines which are formed in advance by the radio transmission line forming unit 13. For this reason, compared to a case where the radio transmission line is dynamically set by the call processing, the load of the process of switching the transmission lines when making the handover is positively distributed among the handover trunks $11_1$ through $11_N$.

The switching system described above may be provided with a storage unit 21 which is registered in advance with a set of radio zones corresponding to the adjacent zones or the peripheral zones, with respect to each of the radio zones formed by the radio base stations. In this case, the call processing unit 14 obtains the radio zone where the mobile station which generated the call is located or is predicted to be located, with respect to each of the calls subject to the call processing. In addition, the call processing unit 14 notifies the radio zones registered in the storage unit 21 with respect to the obtained radio zone to at least one of the handover trunks $11_1$ through $11_N$ connected to the radio transmission line. The handover trunks $11_1$ through $11_N$ selects the radio transmission line having the best transmission quality by limiting candidates to the radio transmission lines corresponding to the radio zones notified by the call processing unit 14.

In this case, with respect to each of the calls allocated thereto, the handover trunks $11_1$ through $11_N$ compare the transmission qualities of only the transmission lines formed via the radio transmission line forming unit 13 between the switching system and the radio zones where the mobile station which generated the call may be located. As a result, the load on the handover trunks $11_1$ through $11_N$ is considerably reduced, and it is possible to maintain a high transmission quality while positively adapting to the handover that is frequently made depending on the movements of the mobile stations.

In addition, in the switching system described above, the radio transmission line forming unit 13 and the remote transmission line forming unit 15 may be integrally formed as a single unit, so as to form the radio transmission lines by the call processing carried out by the call processing unit 14.

In this case, the radio transmission lines are formed by sharing the remote transmission line forming unit 15 which forms the remote transmission lines. As a result, it is possible to flexibly adapt to the handover that is frequency carried out, without modifying the hardware structure.

Moreover, in the switching system described above, the radio transmission line forming unit 13 and the remote transmission line forming unit 15 are formed independently as separate units, so as to automatically form all of the radio transmission lines.

The remote transmission line forming unit 15 may not be able to form all of the radio transmission lines in advance within the range of the number of ports peculiar to the remote transmission line forming unit 15. But even in such a case, the load of the remote transmission line forming unit 15 and the call processing unit 14 can be positively distributed with respect to the handover trunks $11_1$ through $11_N$ using the construction having radio transmission line forming unit 13 provided independently of the remote transmission line forming unit 15. In addition, a high transmission quality can be maintained by adapting to the handover that is frequently carried out.

Furthermore, in the switching system described above, an asynchronous transfer mode may be applied to the plurality of lines formed between the radio interfaces $12_1$ through $12_M$ and the plurality of radio base stations, so that the radio transmission line forming unit 13 forms the radio transmission lines conforming to the asynchronous transfer mode.

In this case, uniform communication channels can be secured not only for the calls in the telephone system but also the calls in the data system. In addition, the handover trunks $11_1$ through $11_N$ can efficiently select the transmission lines by referring to headers of the cells into which the transmission information is divided.

Next, a description will be given of an embodiment of the switching system according to the present invention.

Figure 4:
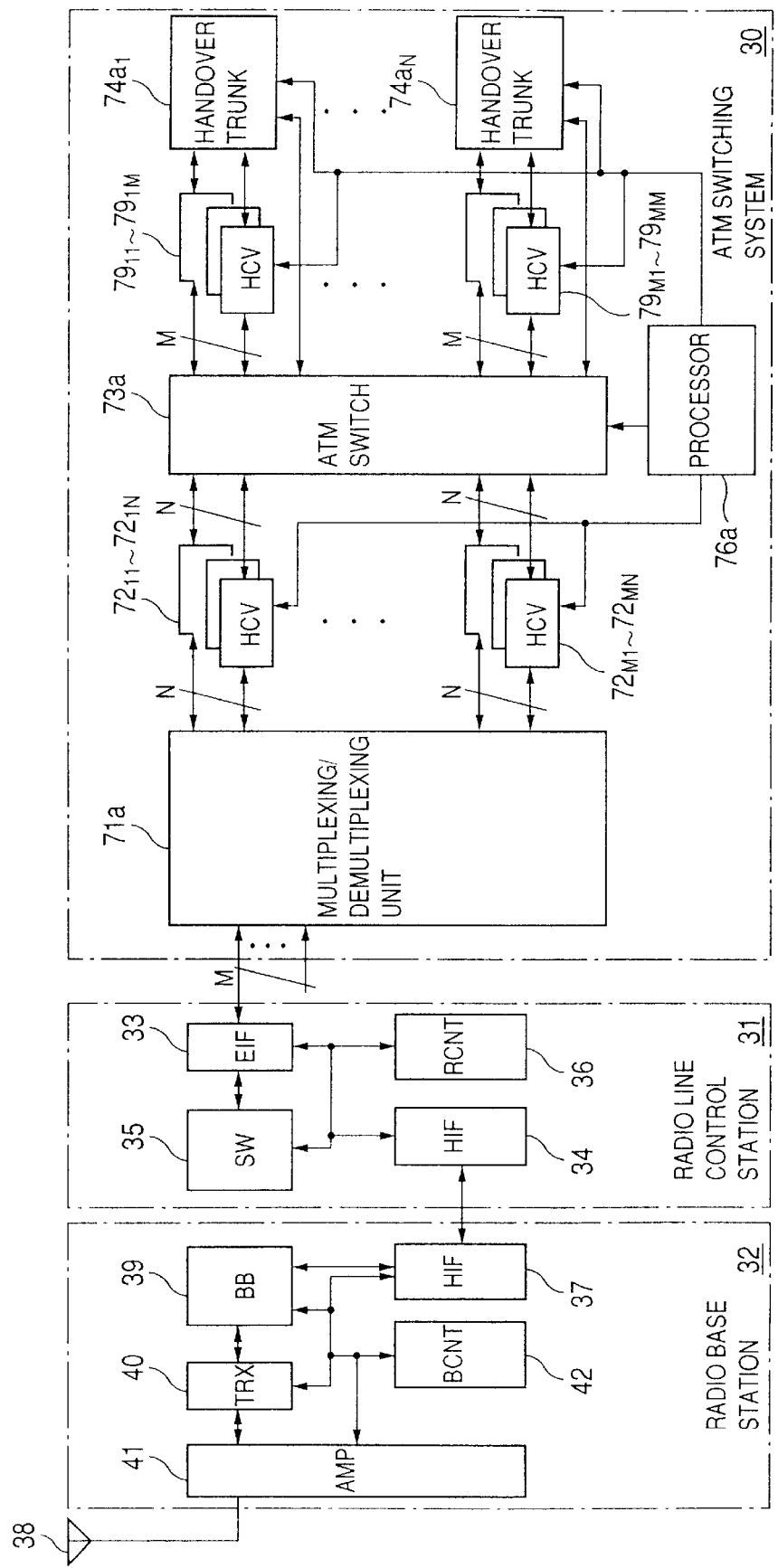
FIG. 4 is a system block diagram showing an embodiment of a switching system according to the present invention.

FIG. 4 is a system block diagram showing this embodiment of the switching system. In FIG. 4, those parts which are essentially the same as those corresponding parts in FIG. 1 are designated by the same reference numerals, and a description thereof will be omitted. In FIG. 4, a radio line control station 31 and a radio base station 32 are connected to an ATM switching system 30 via communication links.

In the following description, it will be assumed for the sake of convenience that one radio line control station 31 and one radio base station 32 are provided, so as to simplify the description.

The ATM switching system 30 shown in FIG. 4 differs from the switching system shown in FIG. 1 in that a multiplexing/demultiplexing unit 71a is provided in place of the multiplexing/demultiplexing unit 71, and the radio line control stations 31 (only one shown in FIG. 4) are connected to the multiplexing/demultiplexing unit 71a via independent lines. In addition, header converters $72_{I1}$ through $72_{IN}$, ..., $72_{M1}$ through $72_{MN}$ and header converters $79_{I1}$ through $79_{IM}$, ..., $79_{M1}$ through $79_{MM}$ are provided in place of the header converters $72_{u1}$ through $72_{um}$, ..., $72_{d1}$ through $72_{dm}$. Handover trunks $74a_1$ through $74a_N$ are provided in place of the handover trunks $74_1$ through $74_m$, and a processor 76a is provided in place of the processor 76.

The header converters $72_{I1}$ through $72_{IN}$, ..., $72_{M1}$ through $72_{MN}$ respectively are integrally formed by a combination of header converters corresponding to the up-link and the down-link, such as the combination of the header converters $72_{u1}$ and $72_{d1}$ in the case of the switching system shown in FIG. 1, for example, and the header converters $79_{I1}$ through $79_{IM}$, ..., $79_{M1}$ through $79_{MM}$ respectively are integrally formed by a similar combination.

The radio line control station 31 includes an external interface (EIF) 33 connected to the lines described above, a transmission line interface (HIF) 34 connected to a digital link which is formed between the radio line control station 31 and the radio base station 32, a switch part (SW) 35 interposed between the transmission line interface 34 and the external interface 33, and a radio controller (RCNT) 36 which is connected to control terminals of the external interface 33, the transmission line interface 34 and the switch part 35.

The radio base station 32 includes a transmission line interface (HIF) 37 connected to the digital link which is formed between the radio line control station 31 and the radio base station 32, a baseband signal processor (BB) 39, a radio unit (TRX) 40 and a transmission/reception amplifier (AMP) 41 which are connected in series between the transmission line interface 37 and a power supply end of an antenna 38, and a controller (BCNT) 42 connected to control terminals of the transmission line interface 37, the baseband signal processor 39, the radio unit 40 and the transmission/reception amplifier 41.

Figure 5:
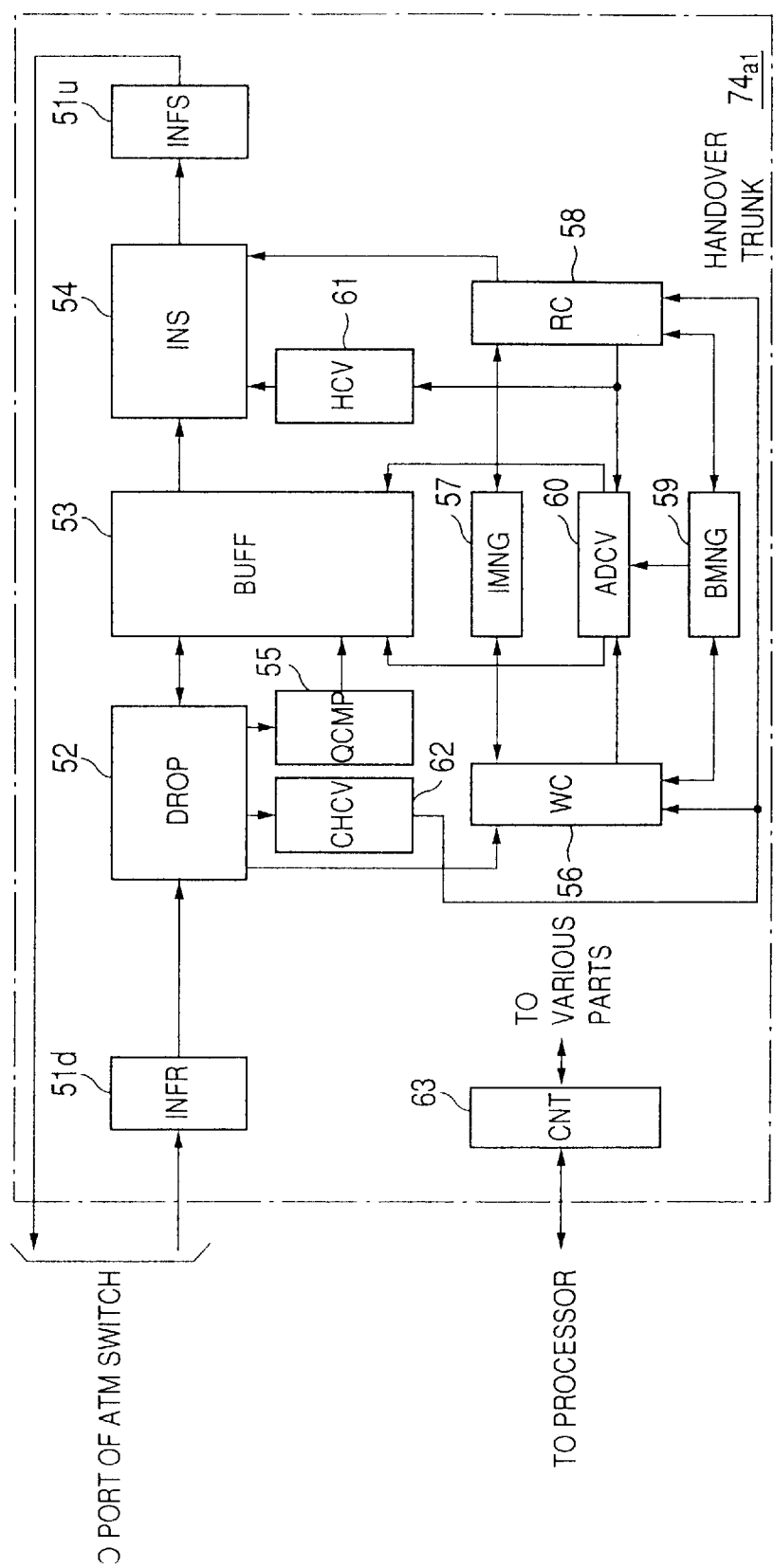
FIG. 5 is a system block diagram showing an embodiment of a handover trunk.

FIG. 5 is a system block diagram showing an embodiment of the handover trunk $74a_1$. As shown in FIG. 5, the handover trunk $74a_1$ includes a line interface (INRF) 51d, a line interface (INFS) 51u, a cell extraction unit (DROP) 52, a cell buffer (BUFF) 53, a cell converter (INS) 54, a quality information comparator (QCMP) 55, a write controller (WC) 56, a cell information manager (IMNG) 57, a read controller (RC) 58, a buffer manager (BMNG) 59, an address converter (ADCV) 60, a header converter (HCV) 61, a cell identifier (CHCV) 62, and a controller 63.

The line interface 51d is connected to up-lines and down-lines formed by corresponding ports of the ATM switch 73a. The cell extraction unit 52, the cell buffer 53 and the cell converter 53 are connected in series between the line interfaces 51d and 51u. The quality information comparator 55 is connected to a quality information output terminal of the cell extraction unit 52 and a quality information input terminal of the cell buffer 53. The write controller 57, the cell information manager 57 and the read controller 58 are connected in series between a control output of the cell extraction unit 52 and a control input of the cell converter 54. The buffer manager 59 is connected to control terminals of the write controller 56 and the read controller 58. The address converter 60 is connected to an output terminal of the buffer manager 59 and between address output terminals of the write controller 56 and the read controller 58 and two address inputs of the cell buffer 53. The header converter 61 is arranged between the address output terminal of the read controller 58 and a header input terminal of the cell converter 54. The cell identifier 62 is arranged between an address output of the cell extraction unit 52 and address inputs of the write controller 56 and the read controller 58. The controller 63 is connected to the processor 76a via a communication link and generally controls each of the parts 51d through 62 forming the handover trunk $74a_1$.

In this embodiment of the switching system, the handover trunks $74a_1$ through $74a_N$ shown in FIG. 4 correspond to the handover trunks $11_1$ through $11_N$ shown in FIG. 3. The multiplexing/demultiplexing unit 71a and the header converters $72_{I1}$ through $72_{IN}$, ..., $72_{M1}$ through $72_{MN}$ shown in FIG. 4 correspond to the radio interfaces $12_1$ through $12_M$. In addition, the ATM switch 73a and the header converters $79_{I1}$ through $79_{IN}$, ..., $79_{M1}$ through $79_{MM}$ shown in FIG. 4 correspond to the radio transmission line forming unit 13 and the remote transmission line forming unit 15 shown in FIG. 3, and the processor 76a shown in FIG. 4 corresponds to the call processing unit 14.

Figure 6:
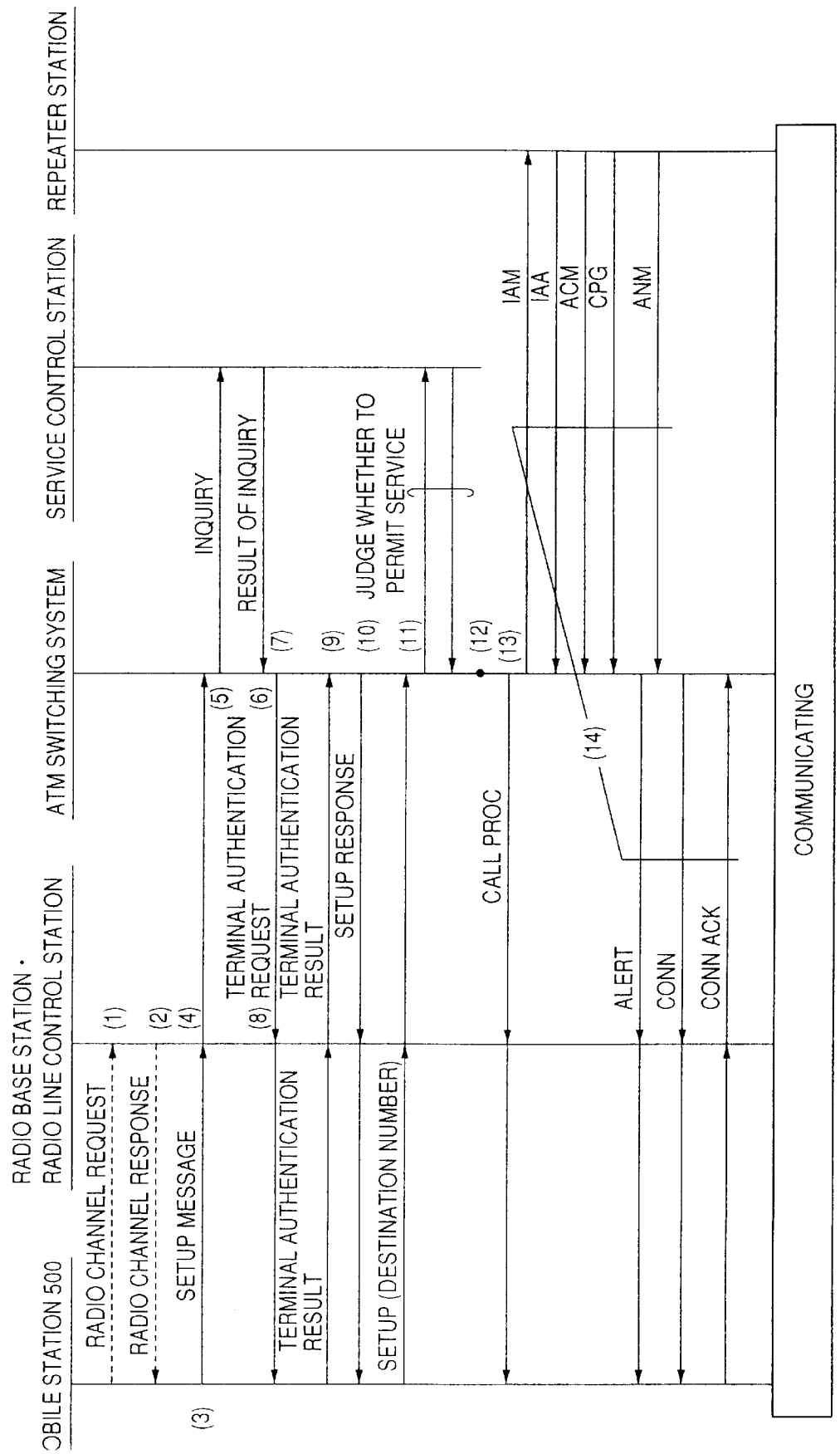
FIG. 6 is a time chart for explaining the operation of the embodiment of the switching system.
Figure 7:
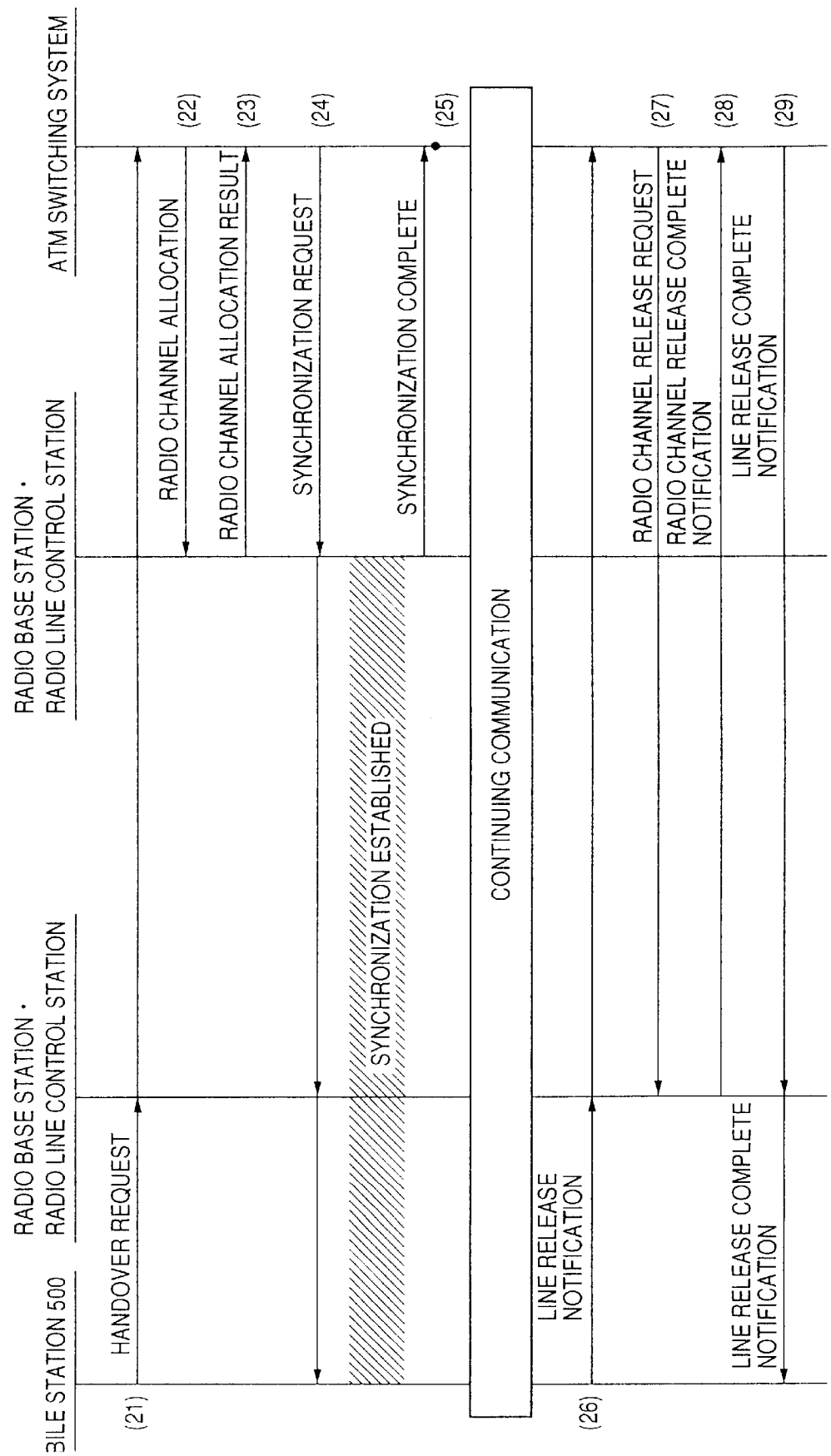
FIG. 7 is a time chart for explaining the operation of the embodiment of the switching system.

FIGS. 6 and 7 are time charts for explaining the operation of this embodiment of the switching system. Next, a description will be given of the operation of this embodiment of the switching system, by referring to FIGS. 5, 6 and 7.

In the radio base station 32, the radio unit 40 and the transmission/reception amplifier 41 form a radio zone via the antenna 38. Under a main control of the radio controller 36 which is provided at the remote end via the transmission interfaces 37 and 34, the controller 42 carries out a radio channel setting control with respect to the radio zone, and also carries out controls related to management, setting and release of the radio line of the radio base station 32 to which the controller 42 belongs.

In the radio line control station 31, under the radio channel setting control described above, the switch part 35 carries out a diversity handover process with respect to a plurality of radio base stations which are formed under control of the radio line control station 31 to which the switch part 35 belongs. In addition, the baseband signal processor 39 carries out with respect to the information which is exchanged between the radio line control station 31 to which the baseband signal processor 39 belongs and the remote mobile station (not shown) which confronts the radio line control station 31 via the antenna 38, the transmission/reception amplifier 41 and the radio unit 40, modulation and demodulation processes in conformance with the CDMA, encoding and decoding processes in conformance with an error correction code adapted to the radio transmission line, a synchronization control process, information multiplexing and demultiplexing processes, and a process for realizing handover synthesis process among the sectors.

The radio controller 36 is connected to the switch part 35 and the transmission line interface 34, and confronts the remote mobile station described above via the transmission line interface 37, the baseband signal processor 39, the radio unit 40, the transmission/reception amplifier 41 and the antenna 38. The radio controller 36 exchanges control information with the remote mobile station based on the radio channel setting control procedure described above.

Figure 8:
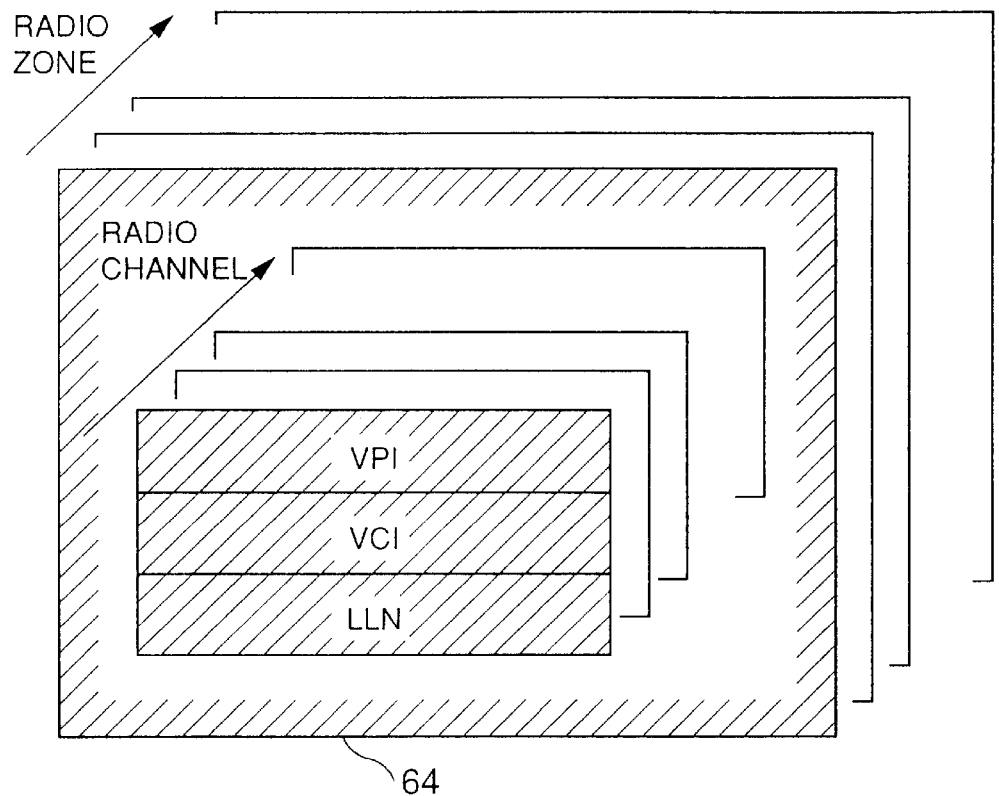
FIG. 8 is a diagram showing the construction of a radio PVC table.

On the other hand, in the ATM switching system 30, the processor 76a includes, as station information, a radio PVC table 64 shown in FIG. 8. The VCI, the VPI and the LLN indicating the construction, that is, identification information of the partial filling cell, is registered in advance in this radio PVC table 64, with respect to the PVCs (hereinafter referred to as radio PVCs) to be formed in correspondence with each of the radio channels formed in the radio zone described above in the section reaching the ports of the ATM switch 73a corresponding to the header converters $79_{I1}$ through $79_{IN}$, . . . , $79_{M1}$ through $79_{MM}$ and the handover trunks $74a_1$ through $74a_N$ via the multiplexing/demultiplexing unit 71a and the header converters $72_{I1}$ through $72_{nN}$, . . . , $72_{M1}$ through $72_{MN}$.

Figure 9:
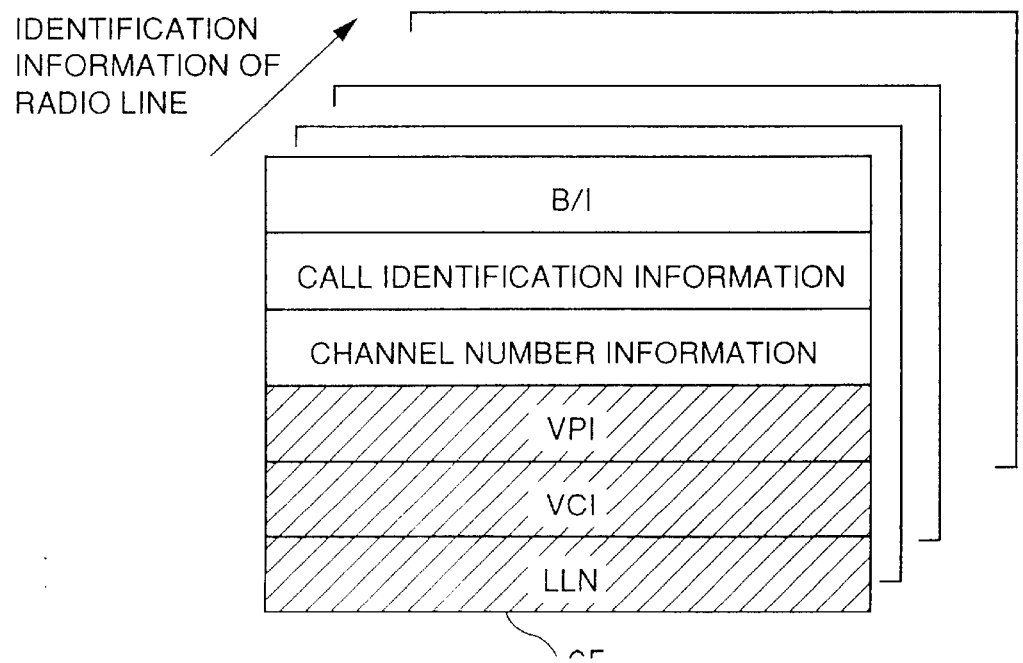
FIG. 9 is a diagram showing the construction of a radio line table.

The processor 76a includes a radio line table 65 shown in FIG. 9. With respect to the lines (hereinafter referred to as radio lines) which are connected to one of the radio PVCs described above via the header converters $72_{I1}$ through $72_{IN}$, . . . , $72_{M1}$ through $72_{MN}$, the ATM switch 73a and the header converters $79_{I1}$ through $79_{IN}$, . . . , $79_{M1}$ through $79_{MM}$, and are to be allocated to the calls and the handover trunks $74a_1$ through $74a_N$ under the resource management of the ATM switching system 30 to which the processor 76a belongs, the radio line table 65 stores status information B/I, call identification information and channel number information, in addition to the VCI, VPI and the LLN. The status information B/I indicates whether or not the radio line is allocated to a call. The call identification information indicates the identification information of the corresponding call when the status information B/I is a status B which indicates that the radio line is allocated to a call. The channel number information indicates the channel number indicating the radio channel which is allocated to the call.

Figure 10:
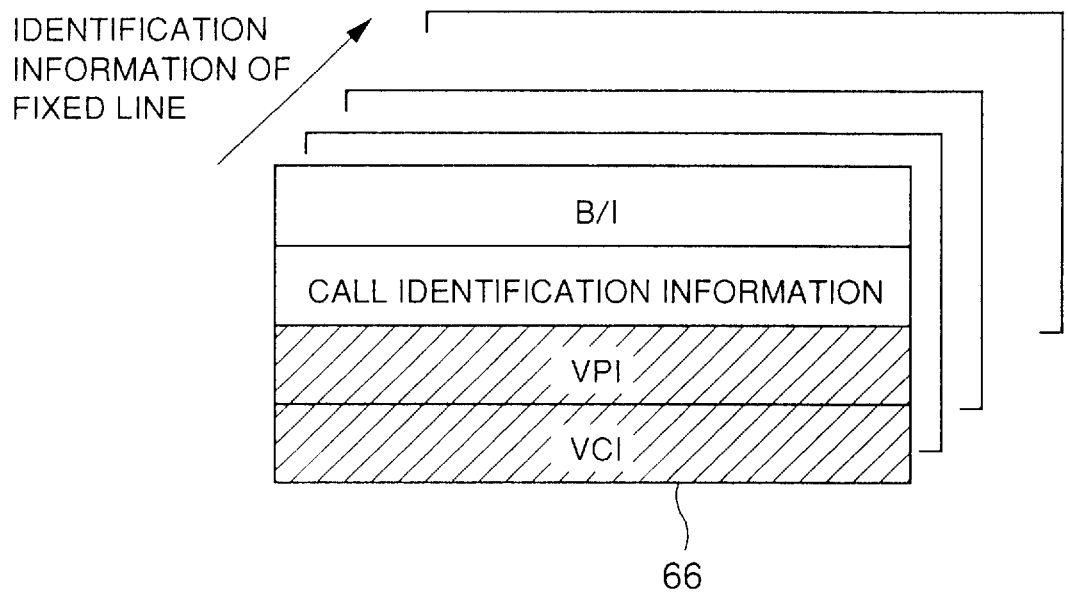
FIG. 10 is a diagram showing the construction of a fixed line table.

Furthermore, the processor 76a includes a fixed line table 66 shown in FIG. 10. With respect to the lines (hereinafter referred to as fixed lines) which are connected to the radio lines via one of the handover trunks $74a_1$ through $74a_N$, and are to be used to form the transmission lines reaching the other party via one of the header converters $72_{I1}$ through $72_{IN}$, . . . , $72_{M1}$ through $72_{MN}$, the ATM switch 73a and the header converters $79_{I1}$ through $79_{IN}$, . . . , $79_{M1}$ through $79_{MM}$, the fixed line table 66 includes status information B/I and call identification information, in addition to the VCI and the VPI. The status information B/I indicates whether or not the fixed line is allocated to a call. The call identification information indicates the identification information of the corresponding call when the status information B/I is a status B which indicates that the fixed line is allocated to the call.

The VCI, the VPI and the LLN which are stored in the radio line table 65 and he fixed line table 66 described above, are set as station information similarly as in the case of the radio PVC table 64.

In the ATM switching system, when the ATM switching system 30 starts to operate or, when one of the radio base station 32, the radio line control station 31 and the multiplexing/demultiplexing unit 71a starts to operate, the processor 76a successively obtains the combination of the VCI, the VPI and the LLN registered in the radio PVC table 64. In addition, the processor 76a supplies the obtained combinations to the communication links (not shown) which are already provided with respect to the radio base station 32, the radio line control station 31 and the multiplexing/demultiplexing unit 71a while making the combinations correspond to the corresponding radio channels.

The radio base station 32, the radio line control station 31 and the multiplexing/demultiplexing unit 71a regularly form the PVCs adapted to the VCI, the VPI and the LLN which are obtained as described above in the sections from the radio base station 32 to the ATM switch 73a via the radio line control station 31, the multiplexing/demultiplexing unit 71a and the header converters $72_{I1}$ through $72_{IN}$, . . . , $72_{M1}$ through $72_{MN}$.

As indicated by the hatching in the radio line table 65 and the fixed line table 66 shown in FIGS. 9 and 10, the individual constructions of the radio line and the fixed line are preset as the station information. However, the processor 76a allocates the radio line and the fixed line every time the call is generated. For this reason, an initializing process sets a status I which indicates that no allocation is made to any of the calls with respect to all status information B/I included in the radio line table 65 and the fixed line table 66.

On the other hand, when a mobile station 500 makes a call, for example, the mobile station 500 generates a "radio channel request" which request allocation of the radio channel to the mobile station 500, and transmits this "radio channel request" to the radio base station 32 in a step (1) shown in FIG. 6.

In the radio line control station 31, the radio controller 36 reads the "radio channel request" via the antenna 38, the transmission/reception amplifier 41, the radio unit 40, the baseband signal processor 39 and the transmission line interfaces 37 and 34. In addition, when the radio controller 36 recognizes the identification information of the mobile station 500 included in the "radio channel request", the radio controller 36 allocates a free radio channel with respect to the mobile station 500. For the sake of convenience, it will be assumed that a free radio channel having the channel number "7" is allocated with respect to the mobile station 500. The radio controller 36 generates a "radio channel response" which includes the channel number and the like and indicates the result of the radio channel allocation, and transmits this "radio channel response" to the mobile station 500 via the transmission line interfaces 34 and 37, the baseband signal processor 39, the radio unit 40, the transmission/-reception amplifier 41 and the antenna 38 in a step (2) shown in FIG. 6.

A path that is used to exchange the control information between the mobile station 500 and the radio controller 36 based on the radio channel setting control procedure is the same as the path used to exchange the "radio channel request" and the "radio channel response" as described above, and a reference to this path will be omitted in the following description.

The mobile station 500 transmits to the radio base station 32 a "setup message" which indicates an originating call in a step (3) shown in FIG. 6 when the "radio channel response" is recognized. The radio controller 36 supplies this "setup message" to the ATM switching system 30 via the external interface 33 in a step (4) shown in FIG. 6.

In the ATM switching system 30, when the processor 76areceives the "setup message" via the communication links described above, the processor 76a makes an inquiry to a service control station (not shown) in a step (5) shown in FIG. 6 so as to determine whether or not to permit the message, with respect to the mobile station 500 at the calling source indicated by the "setup message". Further, when authentication information of the corresponding mobile station 500 is received in a step (6) shown in FIG. 6 as a response of the service control station with respect to the inquiry, the processor 76a temporarily stores the authentication information. In addition, in order to request information that is required to judge whether or not the mobile station 500 at the source is appropriate as the subject of the service, the processor 76a transmits a "terminal authentication request" with respect to the radio line control station 31 in a step (7) shown in FIG. 6.

The "terminal authentication request" is transmitted to the mobile station 500 in a step (8) shown in FIG. 6 via the communication links described above, the external interface 33, the radio controller 36, the transmission line interfaces 34 and 37, the baseband signal processor 39, the radio unit 40, the transmission/reception amplifier 41 and the antenna 38.

A path that is used to exchange the control information between the mobile station 500 and the processor 76a is the same as the path used to exchange the "setup message" and the "terminal authentication request" as described above, and a reference to this path will be omitted in the following description.

When the processor 76a receives a "terminal authentication result" from the mobile station 500 via the radio base station 32 and the radio line control station 31 as a response to the "terminal authentication request", the processor 76a judges the appropriateness of the contents of the "terminal authentication result" in a step (9) shown in FIG. 6 based on a correlation of the contents and authentication information which is stored in advance. In addition, the processor 76a when the contents of the "terminal authentication result" is judged as being appropriate, the processor 76a transmits a "setup response message" with respect to the mobile station 500 in a step (10) shown in FIG. 6 to indicate the appropriateness of the contents of the "terminal authentication result".

When the mobile station 500 recognizes the "setup response message", the mobile station 500 transmits a "setup (destination number) message" which indicates the destination. In the radio line control station 31, the radio controller 36 adds the channel number of the radio channel allocated to the call prior to the "setup (destination number) message", and relays a similar "setup (destination number) message" with resect to the ATM switching system 30.

When the processor 76a receives such a "setup (destination number) message" in a step (11) shown in FIG. 6, the processor 76a stores the channel number included in the received "setup (destination number) message" in correspondence with the call identification information, and thereafter makes an inquiry to the service control station so as to judge whether or not the destination is appropriate as the subject of the call processing. Moreover, if it is judged that the destination is appropriate as the subject of the call processing, the processor 76a acquires one of the handover trunks $74a_1$ through $74a_N$ that is free in a step (12) shown in FIG. 6. For the sake of convenience, it will be assumed that the handover trunk $74a_1$ is free and is acquired by the processor 76a.

Figure 11:
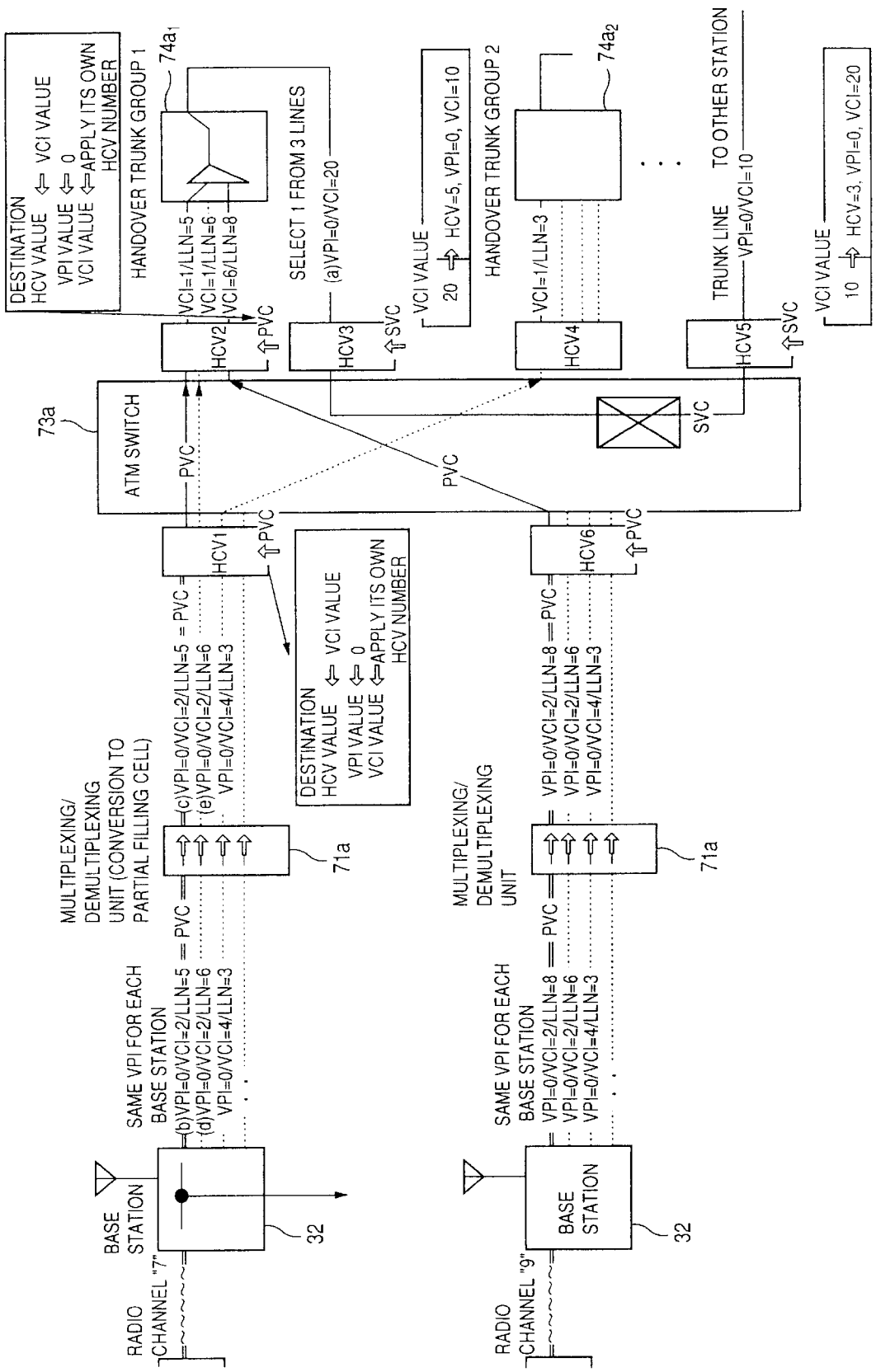
FIG. 11 is a diagram for explaining an embodiment of a PVC formed in the embodiment of the switching system.

In addition, the processor 76a makes a reference to the fixed line table 66 shown in FIG. 10 and obtains a single fixed line which is free, that is, the single fixed line having the status I as the status information B/I. The processor 76a sets the call identification information included in the "setup (destination number) message" as call identification information corresponding to the single fixed line that is obtained, and acquires the single fixed line. In FIG. 11 which is a diagram for explaining an embodiment of the PVC formed in this embodiment, it will be assumed that this single fixed line that is acquired is is selected from specific three lines and is defined by VPI=0 and VCI=20 as indicated by (a). In FIG. 11, those parts which are the same as those corresponding parts in FIG. 4 are designated by the same reference numerals, and a description thereof will be omitted. Further, for the sake of convenience, the illustration of the radio line control station 31 is omitted in FIG. 11, and only some of the header converters $72_{l1}$ through $72_{lN}$, ..., $72_{M1}$ through $72_{MN}$ and $79_{l1}$ through $79_{lM}$, ..., $79_{M1}$ through $79_{MM}$ are shown by header converter numbers HCV1 through HCV6.

The processor 76a also makes a reference to the radio PVC table 64 shown in FIG. 8 using, as a key, the channel number included in the "setup (destination number) message", and specifies the radio PVC corresponding to the channel number. It will be assumed that this radio PVC that is specified is defined by VPI=0, VCI=2 and LLN=5 as indicated by (b) in FIG. 11.

In addition, the processor 76a makes a reference to the radio line table 65 shown in FIG. 9, and obtains a single radio line which is free, that is, the single radio line having the status I as the status information B/I. Further, the processor 76a sets the call identification information and the channel number included in the "setup (destination number) message" as the call identification information and channel number corresponding to the single radio line, and acquires this single radio line. It will be assumed that this single radio line that is acquired is defined by VPI=0, VCI=1 and LLN=5 as indicated by (c) in FIG. 11.

The processor 76a also supplies in addition to the radio PVC that is obtained as described above the constructions of the fixed lines and the radio lines which are indicated by VPI, the VCI, the LLN and the like, with respect to one of the header converters $72_{l1}$ through $72_{lN}$, ..., $72_{M1}$ through $72_{MN}$ corresponding to the radio PVC, the ATM switch 73a, one of the header converters $79_{l1}$ through $79_{lN}$, ..., $79_{M1}$ through $79_{MM}$ and the handover trunk $74a_1$. As a result, the handover trunk $74a_1$ is connected to the radio PVC via the radio line, and is also connected to the corresponding port of the ATM switch 73a via the fixed line, as one end of the transmission line reaching the other party which is specified as a result of the number analysis based on the call processing procedure.

Further, by supplying the constructions of the radio PVC, the radio line and the fixed line to the handover trunk $74a_1$, the processor 76a starts the handover trunk $74a_1$, and transmits a "call processing message" to the mobile station 500 in a step (13) shown in FIG. 6. This "call processing message" indicates the call set-up processing stage. In addition, the processor 76a carries out a call set-up in a step (14) shown in FIG. 6 based on a predetermined procedure by confronting the switching system at the destination. Hence, the processor 76a provides a communication service with respect to the call when the processor 76a recognizes that the other party responded.

When the parts of the handover trunk $74a_1$ are started as described above, these parts carry out the following operations under the control which is mainly made by the controller 63.

The line interfaces 51d and 51u carry out synchronization with respect to each of the cells obtained via the corresponding ports of the ATM switch 73a, and carry out format conversions adapted to the processes carried out by the various parts of the handover trunk $74a_1$ provided between the line interfaces 51d and 51u. The cell having the converted format is referred to as an internal cell. The cell extraction unit 52 reads the internal cell which is obtained via the line interface 51d, and successively extracts the VPI, the VCI, the quality information and other control information included in the internal cell. With respect to each internal cell, the write controller 56 obtains the control information required for the storage via the cell extraction unit 52 and the cell identifier 62. The address converter 60 successively converts the control information obtained by the write controller 56, including the cell number, the VPI and the VCI, into a write address based on the region management carried out by the buffer manager 59. In addition, the cell buffer 53 stores the internal cell which is obtained via the cell extraction unit 52 into a storage region indicated by the write address.

The read controller 58 carries out a control related to the read operation with respect to the cell buffer 53, based on the management carried out with respect to the internal cell by the cell information manager 57 depending on the control information obtained by the write controller 56 and based on the management carried out by the buffer manager 59. The management carried out with respect to the internal cell by the cell information manager 57 includes a decision to determine whether or not the internal cell is to be the subject of the read operation. The address converter 60 generates a read address of the cell buffer 53 depending on the control and region management described above.

The header converter 61 generates the header which is to be updated based on the constructions of the radio PVC, the radio line and the fixed line supplied from the processor 76*a* via the controller 63, under the control of the read controller 58.

The cell converter 54 successively reads the internal cell from the storage region of the cell buffer 53 indicated by the read address generated by the address converter 60, and sets the header generated by the header converter 61 as the header of the read internal cell. With respect to the internal cell which is obtained in this manner, the line interface 51*u* generates a corresponding cell by carrying out a format conversion similarly to the line interface 51*d*, and supplies the generated cell to the corresponding port of the ATM switch 73*a* while maintaining synchronism of the cells.

Accordingly, a transmission line which connects the radio line and the fixed line is regularly formed in the handover trunk 74*a*$_1$.

In addition, with respect to a radio zone adjacent to the radio zone in which the mobile station 500 is located, the mobile station 500 receives in advance the radio channel the transmission quality of which is to be managed, and in the service state, constantly manages the transmission quality of this radio channel. Furthermore, when the mobile station 500 recognizes that the adjacent radio zone having the detected transmission quality can be a candidate of the handover destination, the mobile station 500 transmits a "handover request" in a step (21) shown in FIG. 7. This "handover request" indicates that the adjacent zone having the detected transmission quality can be the candidate of the handover destination, and includes identification information of the radio zone.

In the ATM switching system 30, the processor 76*a* transmits a "radio channel allocation request" in a step (22) shown in FIG. 7 to the radio base station (not shown) which forms the radio zone indicated by the "handover request". When the processor 76*a* receives a "radio channel allocation result" in response to the "radio channel allocation request", the processor 76*a* obtains a channel number indicating the radio channel included in the "radio channel allocation result". For the sake of convenience, it will be assumed that the channel number "9" is obtained as the channel number indicating the radio channel included in the "radio channel allocation result".

In addition, the processor 76*a* makes a reference to the radio line table 65 shown in FIG. 9, and obtains a single radio line which is free, that is, the single radio line having the status I as the status information B/I. Further, the processor 76*a* acquires the radio line by setting the call identification information included in the corresponding "setup (remote number) message" and the channel number as the call identification information and channel number corresponding to the radio line. In this case, it will assumed for the sake of convenience that the radio line which is acquired is defined by VPI=0, VCI=1 and LLN=6 as indicated by (e) in FIG. 11.

The processor 76*a* also makes a reference to the radio PVC table 64 shown in FIG. 8 using the channel number described above as the key, and specifies in a step (23) shown in FIG. 7 the radio PVC which is formed in advance in correspondence with the candidate radio channel of the handover destination. For the sake of convenience, it will be assumed that the specified radio PVC is defined by VPI=0, VCI=2 and LLN=6 as indicated by (d) in FIG. 11.

Moreover, the processor 76*a* supplies in addition to the radio PVC that is obtained in the above described manner the constructions of the fixed line and the radio line which are similarly obtained with respect to one of the header converters 72$_{I1}$ through 72$_{IN}$, . . . , 72$_{M1}$ through 72$_{MN}$ corresponding to the radio PVC, the ATM switch 73*a*, one of the header converters 79$_{I1}$ through 79$_{IN}$, . . . , 79$_{M1}$ through 79$_{MM}$ and the handover trunk 74*a*$_1$. The constructions of the fixed line and the radio line are indicated by the VPI, the VCI, the LLN and the like. As a result, the handover trunk 74*a*$_1$ is connected to the radio PVC which is defined by VPI=0, VCI=2 and LLN=6 via the radio line which is defined by VCI=1 and LLN=6.

In addition, the processor 76*a* transmits a "synchronization request" with respect to the mobile station 500 in a step (24) shown in FIG. 7. This "synchronization request" indicates that synchronization is to be established with respect to the radio channel which is the candidate of the handover destination. When the synchronization of the radio channel is established between the mobile station 500 and the ATM switching system 30 via the radio base station and the radio line control station which are not shown, the processor 76*a* supplies the constructions of the radio PVC and the radio line to the handover trunk 74*a*$_1$ in a step (25) shown in FIG. 7.

In the handover trunk 74*a*$_1$, the controller 63 carries out a control related to the allocation of the plurality of radio lines that may be formed between the handover trunk 74*a*$_1$ and the ATM switch 73*a* via the line interfaces 51*d* and 51*u*. When the constructions of the radio PVC and the radio line are received from the processor 76*a*, the controller 63 supplies the received constructions and the constructions of the radio PVC and the radio line which are obtained before to the header converter 61, the cell identifier 62 and the quality information comparator 55.

The cell identifier 62 identifies the internal cells corresponding to the constructions of the plurality of radio lines, and notifies the identified internal cells to the write controller 56 and the read controller 58. The header converter 61 carries out the header conversions in parallel with respect to a plurality of combinations of the radio PVCs and the radio lines described above.

The quality information comparator 55 compares the reliability information included in the internal cells corresponding to the constructions of the plurality of radio lines, and selects the internal cell having a maximum transmission quality indicated by the reliability information. The selected internal cell is supplied to the cell buffer 53.

Accordingly, in the handover trunk $74a_1$, a call signal having the highest transmission quality is automatically selected from the call signals which are obtained from the same mobile station 500 in parallel via the plurality of radio zones.

In the service state, the mobile station 500 monitors the down-transmission quality of the radio channels indicated by the channel numbers "7" and "9" described above at a predetermined frequency. When the mobile station 500 recognizes that the monitored transmission quality has deteriorated to such an extent that the radio channel cannot be a candidate of the handover destination, the mobile station 500 transmits a "line release notification" including the identification information of the corresponding radio channel in a step (26) shown in FIG. 7.

On the other hand, in the ATM switching system 30, the processor 76a transmits in a step (27) shown in FIG. 7 a "radio channel release request" to the radio base station which forms the radio channel indicated by the "line release notification". For the sake of convenience, it will be assumed that the radio base station 32 forms the radio channel indicated by the "line release notification". When the processor 76a receives a "radio channel release complete notification" in a step (28) shown in FIG. 7 in response to the "radio channel release request", the processor 76a obtains the channel number included in the "radio channel release complete notification".

Furthermore, the processor 76a makes a reference to the radio line table 65 shown in FIG. 9 using the channel number included in the "radio channel release complete notification" as the key, and releases the corresponding radio line which was acquired. In other words, the processor 76a sets the status I in the radio line table 65 as the status information B/I.

In addition, the processor 76a supplies the construction of the radio line indicated by the VPI, the VCI and the LLN to the handover trunk $74a_1$, and releases the connection between the handover trunk $74a_1$ and the radio line. In this case, the connection between the handover trunk $74a_1$ and the radio line defined by VPI=0, VCI=1 and LLN=5 is released as indicated by (c) in FIG. 11.

The processor 76a also transmits a "line release complete notification" which indicates that the link between the handover trunk $74a_1$ and the radio line is released to the radio base station and the mobile station 500, in a step (29) shown in FIG. 7.

According to this embodiment of the switching system, the PVCs are regularly formed between the radio channels which are independently allocated to the plurality of radio zones accessible by the mobile station 500 and the handover trunks. In addition, the handover is carried out positively and smoothly under cooperation of the selection of the radio line that is automatically carried out by the handover trunk based on the reliability information and the supplemental process that is carried out by the processor 76a with regard to the setting and updating of the selection limit.

Therefore, in this embodiment of the switching system, the processor 76a must carry out a process different from that of the conventional system, however, the load of the process related to the switching of the channels in service, that is, the handover, is distributed among the handover trunks $74a_1$ through $74a_N$, and the response of the switching system is improved.

In FIG. 11, the upper radio base station 32 makes the radio channel number "7" correspond to VPI=0, VCI=2 and LLN=5 for every call. On the other hand, the lower radio base station 32 makes the radio channel number "9" correspond to VPI=0, VCI=2 and LLN=8 for every call. The VPI is the same for each radio base station 32. With respect to the upper radio base station 32, VCI=2 specifies the PVC to the handover trunk $74a_1$, while VCI=4 specifies the PVC to the handover trunk $74a_2$. In addition, with regard to the PVC, the VCI value is set as a destination HCV value, 0 is set as the VPI value and its own HCV value HCV1 is set as the VCI value with respect to the header converter HCV1. Similarly, with regard to the PVC, the VCI value is set as a destination HCV value, 0 is set as the VPI value and its own HCV value HCV2 is set as the VCI value with respect to the header converter HCV2. On the other hand, with regard to the SVC, the VCI value is set to 10 from 20, the VPI value is set to 0 and the HCV value is set to HCV5 with respect to the header converter HCV3. Similarly, with regard to the SVC, the VCI value is set to 20 from 10, the VPI value is set to 0 and the HCV value is set to HCV3 with respect to the header converter HCV5. The header converter HCV5 is coupled to another station via a trunk line.

It is a precondition in the above described embodiment that all of the radio zones are mutually adjacent or peripheral zones. However, the present invention is not limited to the application to such radio zones, and for example, the present invention is similarly applicable to a unit of a collection of radio zones which are formed at geographically scattered locations. Furthermore, in such an application, the handover trunks $74a_1$ through $74a_N$ do not need to compare the transmission qualities with respect to the radio zones which are actually not adjacent or peripheral zones, and it is possible to avoid increase of the scale of the hardware that is required to make the comparison and to avoid the response of the switching system from deteriorating.

The present invention is applied to the existing ATM switching system in the above described embodiment, but the application of the present invention is not limited to the ATM switching system. For example, the present invention is similarly applicable to a Synchronous Transfer Mode (STM) switching system as long as a desired and high response can be secured with respect to the switching of the channels in service, that is, the handover.

Furthermore, a description of a trunk which is used to provide a service with respect to a call which does not require the handover, such as a call generated from a terminal which is fixedly set up, and a description of a call processing which is carried out by mainly controlling such a trunk, will be omitted in this specification because such trunk and call processing are known and are not directly related to the subject matter of the present invention.

In the embodiment described above, the radio transmission lines are formed via the ATM switch 73a and the header converters $79_{I1}$ through $79_{IN}$, . . . , $79_{M1}$ through $79_{MM}$, between the header converters $72_{I1}$ through $72_{IN}$, . . . , $72_{M1}$ through $72_{MN}$ and the handover trunks $74a_1$ through $74a_N$. However, the present invention is not limited to such a construction, and for example, the radio transmission lines may be formed via a hardware which is independent of the ATM switch 73a.

The embodiment is described for a case where there are two radio zones which are candidates of the handover destination, but the number of candidates of the radio zones is of course not limited to two and the number of candidates may be three or more.

Moreover, in the above described embodiment, the radio PVCs corresponding to all of the radio channels are fixedly allocated to the calls. However, when the "call processing message" is received, for example, the radio controller 36 of the radio line control station 31 may dynamically set the corresponding relationship of the radio channels and the radio PVCs which are used for the service.

Next, a description will be given of a communication system applied with the present invention. FIG. 12 is a system block diagram showing the communication system applied with the present invention.

In FIG. 12, the communication system includes a common line signal network 200, a STM/ATM network 201, switching nodes 202, a switching node 203, a known switching node 204, a known switching node 205, a plurality of base stations 301, and a plurality of CDMA stations 302 which are coupled as shown. In FIG. 12, a solid line indicates a STM line, a bold solid line indicates an ATM line, and a bold dotted line indicates a control signal line to the common line signal network 200.

The switching node 202 includes the switching system of the present invention, such as the ATM switching system 30 shown in FIG. 4. This switching node 202 is coupled to the common signal line network 200 via the control signal line, and is coupled to the STM/ATM network 201 via the STM and ATM lines. This switching node 202 is further coupled to the other switching nodes 202 and 203 via the ATM lines, and is also coupled to the known switching node 205 via the STM line. The base stations 301 can be coupled to the switching node 202 via the STM lines, and the CDMA stations 302 can be coupled to the switching node 202 via the ATM lines.

The switching node 203 includes the switching system of the present invention, such as the ATM switching system 30 shown in FIG. 4. This switching node 203 is coupled to the common signal line network 200 via the control signal line, and is coupled to the STM/ATM network 201 via the STM and ATM lines. This switching node 203 is further coupled to the other switching nodes 202 via the ATM lines, and is also coupled to the known switching node 205 via the STM line.

The known switching node 204 is coupled to the base stations 301 and the other known switching node 205 via the STM lines. This known switching node 204 is also coupled to the common signal line network 200 via the control signal line. On the other hand, the known switching node 205 is coupled to the common signal line network 200 via the control signal line, and is coupled to the STM/ATM network 201 via the STM line.

When the switching system of the present invention is applied to the communication system shown in FIG. 12, it is possible to flexibly cope with frequent generation of handovers, without requiring a considerable modification of the existing hardware forming the switching nodes.

Further, the present invention is not limited to these embodiments, but various variations and modifications may be made without departing from the scope of the present invention.

What is claimed is:

1. A switching system comprising:

N handover trunks respectively having M terminals to be independently coupled to radio transmission lines reaching M radio base stations which respectively form radio zones which become mutually adjacent zones or peripheral zones, and coupled to remote transmission lines reaching mobile stations of other parties located in the radio zones, where M and N are integers greater than one, out of the radio transmission lines, said N handover trunks selecting each transmission line with a best transmission quality and coupling the selected radio transmission lines to the remote transmission lines;

a plurality of radio interfaces distributing lines independently formed between the switching system and the M radio base stations, with respect to different N paths;

a radio transmission line forming unit forming radio transmission lines in advance with respect to all combinations of each of the paths subject to the distribution by said radio interfaces and each of the terminals other than the terminals to be independently coupled to the remote transmission lines out of the terminals of said handover trunks;

a call processing unit carrying out a call processing with respect to calls generated by the mobile stations located in the radio zones by cooperating with a radio channel setting control that is carried out by the radio base stations via said radio interfaces; and a remote transmission line forming unit forming the remote transmission lines by the call processing carried out by said call processing unit.

2. The switching system as claimed in claim 1, which further comprises:

a storage unit which is registered in advance with a set of radio zones corresponding to the adjacent zones or the peripheral zones, with respect to each of the radio zones formed by the radio base stations, said call processing unit including means for obtaining the radio zone where the mobile station which generated the call is located or is predicted to be located, with respect to each of the calls subject to the call processing, and for notifying the radio zones registered in said storage unit with respect to the obtained radio zone to at least one of said handover trunks coupled to the radio transmission line, said handover trunks selecting the radio transmission line having the best transmission quality by limiting candidates to the radio transmission lines corresponding to the radio zones notified by said call processing unit.

3. The switching system as claimed in claim 2, wherein said radio transmission line forming unit and said remote transmission line forming unit are integrally formed as a single unit, so as to form the radio transmission lines by the call processing carried out by said call processing unit.

4. The switching system as claimed in claim 2, wherein said radio transmission line forming unit and said remote transmission line forming unit are formed independently as separate units, so as to automatically form all of the radio transmission lines.

5. The switching system as claimed in claim 2, wherein an asynchronous transfer mode is applied to the plurality of lines formed between said radio interfaces and the plurality of radio base stations, so that said radio transmission line forming unit forms the radio transmission lines conforming to the asynchronous transfer mode.

6. The switching system as claimed in claim 2, wherein said radio transmission line forming unit and said remote transmission line forming unit are integrally formed as a single unit, so as to form the radio transmission lines by the call processing carried out by said call processing unit.

7. The switching system as claimed in claim 6, wherein an asynchronous transfer mode is applied to the plurality of lines formed between said radio interfaces and the plurality of radio base stations, so that said radio transmission line forming unit forms the radio transmission lines conforming to the asynchronous transfer mode.

8. The switching system as claimed in claim 2, wherein said radio transmission line forming unit and said remote transmission line forming unit are formed independently as separate units, so as to automatically form all of the radio transmission lines.

9. The switching system as claimed in claim 8, wherein an asynchronous transfer mode is applied to the plurality of lines formed between said radio interfaces and the plurality of radio base stations, so that said radio transmission line forming unit forms the radio transmission lines conforming to the asynchronous transfer mode.

10. The switching system as claimed in claim 1, wherein said radio transmission line forming unit and said remote transmission line forming unit are integrally formed as a single unit, so as to form the radio transmission lines by the call processing carried out by said call processing unit.

11. The switching system as claimed in claim 10, wherein an asynchronous transfer mode is applied to the plurality of lines formed between said radio interfaces and the plurality of radio base stations, so that said radio transmission line forming unit forms the radio transmission lines conforming to the asynchronous transfer mode.

12. The switching system as claimed in claim 1, wherein said radio transmission line forming unit and said remote transmission line forming unit are formed independently as separate units, so as to automatically form all of the radio transmission lines.

13. The switching system as claimed in claim 12, wherein an asynchronous transfer mode is applied to the plurality of lines formed between said radio interfaces and the plurality of radio base stations, so that said radio transmission line forming unit forms the radio transmission lines conforming to the asynchronous transfer mode.

14. The switching system as claimed in claim 1, wherein an asynchronous transfer mode is applied to the plurality of lines formed between said radio interfaces and the plurality of radio base stations, so that said radio transmission line forming unit forms the radio transmission lines conforming to the asynchronous transfer mode.

* * * * *